United States Patent
Kim et al.

(10) Patent No.: US 9,816,453 B2
(45) Date of Patent: Nov. 14, 2017

(54) CONTROL METHOD OF ELECTRONIC WASTE GATE ACTUATOR

(71) Applicants: Hyundai Motor Company, Seoul (KR); Kia Motors Corporation, Seoul (KR)

(72) Inventors: Young Min Kim, Yongin-si (KR); Hyun Kim, Hwaseong-si (KR); Deok Ryol Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 72 days.

(21) Appl. No.: 14/936,297

(22) Filed: Nov. 9, 2015

(65) Prior Publication Data

US 2017/0009692 A1    Jan. 12, 2017

(30) Foreign Application Priority Data

Jul. 7, 2015    (KR) .................. 10-2015-0096367

(51) Int. Cl.
*B60T 7/12* (2006.01)
*F02D 41/22* (2006.01)
(Continued)

(52) U.S. Cl.
CPC .......... *F02D 41/221* (2013.01); *F02B 37/186* (2013.01); *F02B 39/16* (2013.01);
(Continued)

(58) Field of Classification Search
CPC ......... F02D 2021/083; F02D 2021/086; F02D 2041/0067; F02D 35/0015; F02D 41/0057
(Continued)

(56) References Cited

U.S. PATENT DOCUMENTS

| 4,697,421 A | 10/1987 | Otobe et al. |
| 2012/0240571 A1* | 9/2012 | Otsuka ................... F02B 37/18 60/601 |

(Continued)

FOREIGN PATENT DOCUMENTS

| JP | H08-74588 | 3/1996 |
| JP | 2002332880 | 11/2002 |

(Continued)

Primary Examiner — John Kwon
(74) Attorney, Agent, or Firm — Brinks Gilson & Lione

(57) ABSTRACT

A control method includes an electronic waste gate actuator (EWGA) and a waste gate valve, connected to each other through a rod. The control method includes an operation condition determination step for determining whether an engine is in cold operation or hot operation by measuring engine soak time and initial coolant temperature when the engine starts and by comparing them with a predetermined reference soak time and reference coolant temperature. The control method also includes a cold control step for setting cold operation reference voltage, performing cold operation learning, and applying cold operation learning data to the cold operation reference voltage, when the engine is in cold operation. The control method further includes a hot control step for setting hot operation reference voltage, performing hot operation learning, and applying hot operation learning data to the hot operation reference voltage, when the engine is in hot operation.

7 Claims, 2 Drawing Sheets

Figure 1:
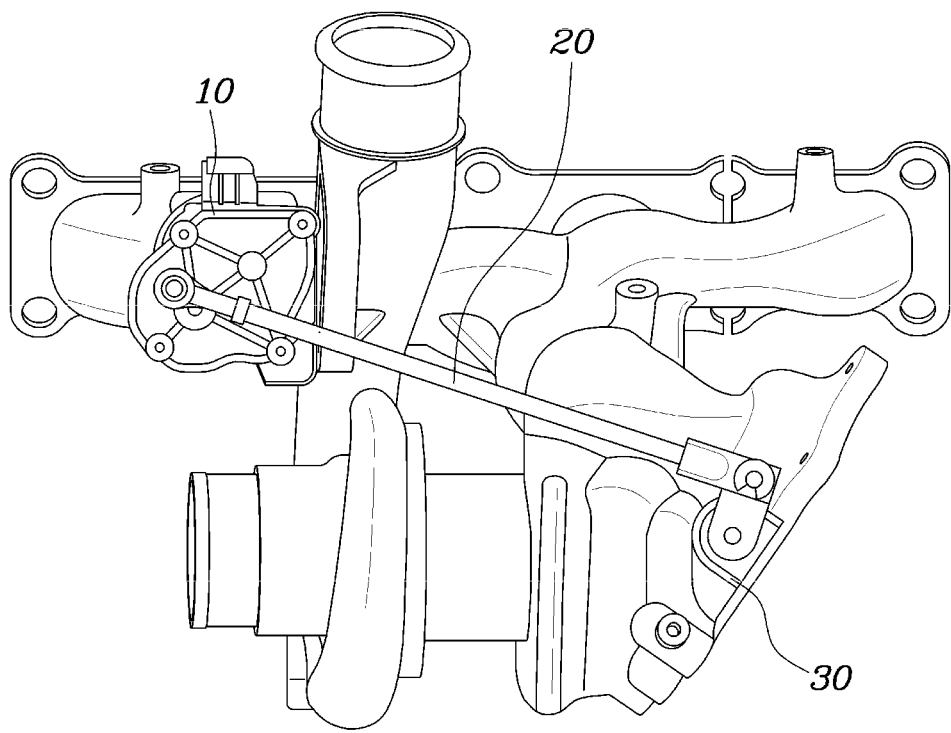

(51) Int. Cl.
*F02B 37/18* (2006.01)
*F02B 39/16* (2006.01)
*F02D 41/24* (2006.01)
*F02D 41/00* (2006.01)
*F02D 35/02* (2006.01)

(52) U.S. Cl.
CPC ..... *F02D 41/0007* (2013.01); *F02D 41/2445* (2013.01); *F02D 35/02* (2013.01); *F02D 2041/227* (2013.01); *F02D 2200/021* (2013.01); *F02D 2200/023* (2013.01)

(58) Field of Classification Search
USPC ............... 701/103, 108, 115; 123/568.11, 123/568.21–568.23, 568.26, 568.31
See application file for complete search history.

(56) References Cited

U.S. PATENT DOCUMENTS

| | | | | |
|---|---|---|---|---|
| 2014/0047832 | A1* | 2/2014 | Matthews | F02B 37/186 60/599 |
| 2014/0341703 | A1* | 11/2014 | Kokotovic | F02B 37/186 415/1 |
| 2015/0101581 | A1* | 4/2015 | Karacic | F02D 41/0007 123/568.21 |

FOREIGN PATENT DOCUMENTS

| | | |
|---|---|---|
| JP | 2003-214246 | 7/2003 |
| JP | 2006-188989 | 7/2006 |
| JP | 2012-180793 | 9/2012 |
| KR | 20030047305 | 6/2003 |
| KR | 20100023582 | 3/2010 |
| KR | 20120054410 | 5/2012 |
| KR | 10-2012-0068417 | 6/2012 |

* cited by examiner

CONTROL METHOD OF ELECTRONIC WASTE GATE ACTUATOR

CROSS-REFERENCE TO RELATED APPLICATIONS

This application claims the benefit of Korean Patent Application No. 10-2015-0096367, filed on Jul. 7, 2015, the contents of which are incorporated herein by reference in its entirety.

FIELD

The present disclosure generally relates to a control method of an electronic waste gate actuator (EWGA).

BACKGROUND

The statements in this section merely provide background information related to the present disclosure and may not constitute prior art.

Generally, in order to improve the output power of a vehicle engine, it is necessary to increase a displacement, the number of valves, or the diameter of a valve.

However, because the amount of air drawn into an engine is limited through these methods, the output power may not be increased more than a certain level.

Conventional methods use a supercharger or turbocharger to obtain an additional increase in output power.

Particularly, because a turbocharger system, which is widely used in an engine intake system, recycles exhaust energy and thus may increase intake pressure compared to a natural aspirated (NA) system, it has advantages of improving fuel efficiency and increasing power.

Boost pressure means static pressure formed by a turbocharger. As the boost pressure increases, the amount of air intake to a cylinder is increased. Also, with an increase in the fuel amount to be burned, the output power is increased and smoke of exhaust gas may be decreased, thus the increase in the boost pressure is advantageous. However, when the boost pressure excessively increases, the turbine speed increases, and thus durability problems may be caused. Accordingly, it is desirable to control the boost pressure under high-speed driving conditions.

To this end, a Waste Gate Turbocharger (WGT), which decreases boost pressure under high-speed driving conditions and increases the boost pressure under low-speed driving conditions, is used.

Depending on the operation of a Waste Gate Actuator (WGA), exhaust gas may be bypassed to a waste gate, and the boost pressure may be controlled.

When the exhaust gas is bypassed, the energy to the turbine of a turbocharger is decreased, thus the boost pressure effect may be reduced.

Consequently, under low-speed driving conditions, most exhaust gas is used for energy boosting to increase the boost pressure, whereas under high-speed driving conditions, only a part of energy of the exhaust gas is used, thus preventing the boost pressure from excessively increasing.

As related art specifically discloses the description about the WGA.

FIG. 1 is a view showing the connection of a general electronic waste gate actuator, a waste gate valve, and a rod.

As illustrated in FIG. 1, the rod 20 connects the EWGA (Electric Waste Gate Actuator) 10 to the waste gate valve 30 in the document of the related art. The length of the rod 20 is increased due to thermal expansion at hot operation of an engine, but the length is decreased at cold start or cold operation of the engine.

In other words, due to the thermal expansion of the rod 20 and the increase in mileage of a vehicle, the voltage value of the EWGA 10 is changed, thus a warning light of the turbocharger may be lit and poor acceleration in the vehicle may be experienced.

SUMMARY

The present disclosure provides a control method of an electronic waste gate actuator, which classifies the operation of an engine into cold operation and hot operation according to the operation condition of the engine, performs cold operation learning and hot operation learning, and controls the electronic waste gate actuator depending on the cold operation learning and hot operation learning.

The present disclosure provides a control method for an electronic waste gate actuator system including an electronic waste gate actuator (EWGA) and a waste gate valve, which are connected to each other through a rod, the control method including: an operation condition determination step for determining whether an engine is in cold operation or in hot operation by measuring an engine soak time and an initial temperature of coolant when the engine starts and by respectively comparing the engine soak time and the initial temperature of the coolant with a predetermined reference soak time and a predetermined reference coolant temperature; a cold control step for setting a cold operation reference voltage, for performing cold operation learning, and for applying cold operation learning data to the cold operation reference voltage, when it is determined at the operation condition determination step that the engine is in cold operation; and a hot control step for setting a hot operation reference voltage, for performing hot operation learning, and for applying hot operation learning data to the hot operation reference voltage, when it is determined at the operation condition determination step that the engine is in hot operation.

The cold control step may be configured to measure in real time a driving coolant temperature during driving of a vehicle while controlling the EWGA depending on the cold operation reference voltage, and to change to the hot control step when the driving coolant temperature is greater than the reference coolant temperature.

At the cold control step, a cold operation voltage of the EWGA is measured in real time during driving of the vehicle, and the control method may further include a cold limp-home conversion step for converting into a limp-home mode in which rpm of the engine is limited to be equal to or less than 2000 rpm when the cold operation voltage is greater than the cold operation reference voltage after the cold control step.

Also, at the hot control step, a hot operation voltage of the EWGA is measured in real time during driving of the vehicle, and the control method may further include a hot limp-home conversion step for converting into a limp-home mode in which rpm of the engine is limited to be equal to or less than 2000 rpm when the hot operation voltage is greater than the hot operation reference voltage after the hot control step.

In the control method for the EWGA according to one form of the present disclosure, the cold limp-home conversion step and the hot limp-home conversion step may further comprise an alarm step in which an alarm is output to enable a driver to recognize a risk state of the engine.

In one form of the present disclosure the reference soak time is 6 hours and the reference coolant temperature is 20° C.

Further areas of applicability will become apparent from the description provided herein. It should be understood that the description and specific examples are intended for purposes of illustration only and are not intended to limit the scope of the present disclosure.

DRAWINGS

Figure 2:
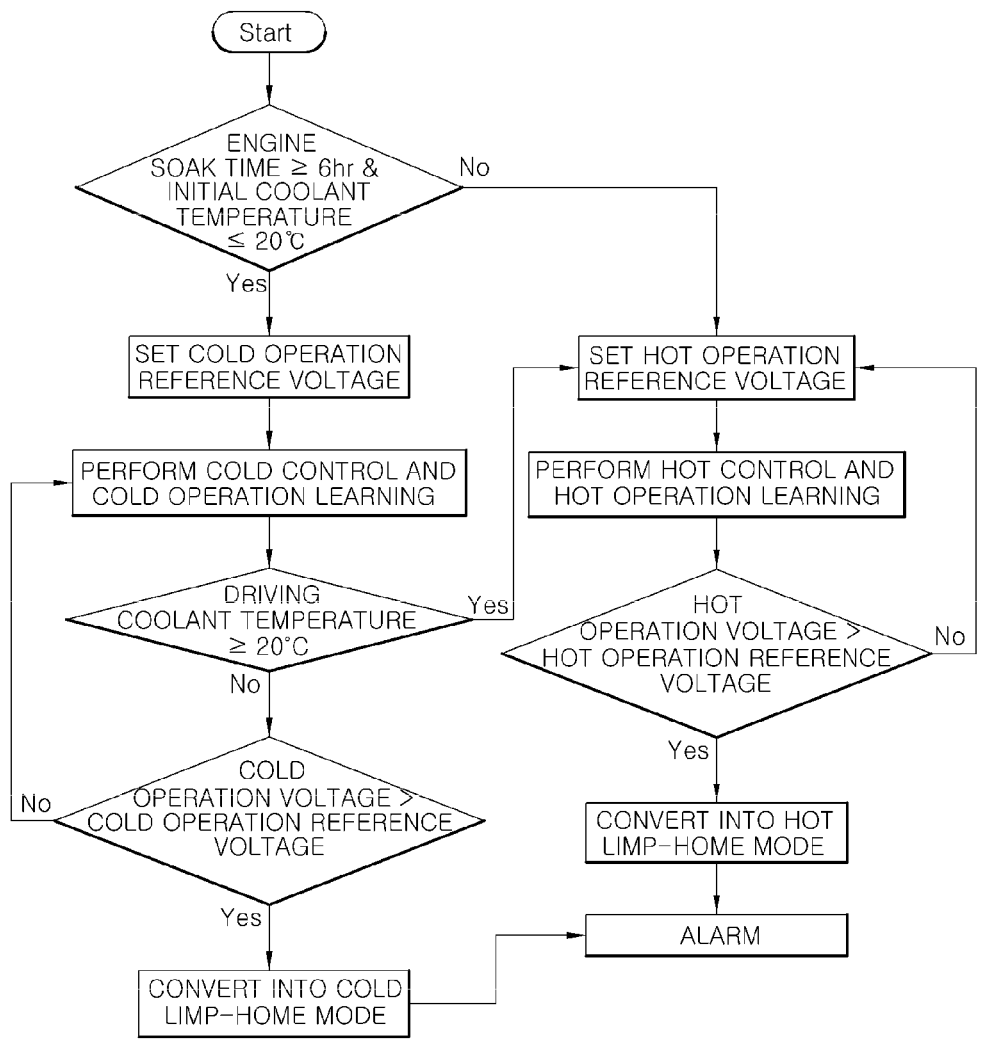

In order that the disclosure may be well understood, there will now be described various forms thereof, given by way of example, reference being made to the accompanying drawings, in which:

FIG. 1 is a view showing the connection of a general electronic waste gate actuator, a waste gate valve, and a rod; and FIG. 2 is a flowchart illustrating a control method of an electronic waste gate actuator according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view showing the connection of a general electronic waste gate actuator, a waste gate valve, and a rod.

As illustrated in FIG. 1, the waste gate valve 30, which is open or closed by the electronic waste gate actuator 10, is connected to the electronic waste gate actuator 10 through the rod 20.

When the operation mode of an engine corresponds to hot operation, the rod 20 is expanded compared to cold operation, due to heat. In this case, the voltage of the electronic waste gate actuator 10 is lower than that at the cold operation.

In other words, the rod 20 contracts at cold start and at cold operation, compared to the hot operation. As a result, the voltage exceeds a reference voltage range that is learned at the hot operation. Accordingly, the warning light of a turbocharger may be lit and poor acceleration may be experienced in the vehicle.

The present disclosure classifies the operation mode of an engine into cold operation and hot operation, and performs a learning step and controls an electronic waste gate actuator 10 according to the classified operation mode, thus reducing an error in signaling the warning light of a turbocharger, and improving vehicle acceleration performance by improving the performance of the turbocharger.

FIG. 2 is a flowchart illustrating a control method of an electronic waste gate actuator according to one form of the present disclosure.

As illustrated in FIG. 2, the control method of an electronic waste gate actuator according to one form of the present disclosure includes an operation condition determination step. Also, according to the operation condition of an engine, the control method includes a cold control step and a hot control step.

The operation condition determination step according to one form of the present disclosure measures the soak time of an engine and initial temperature of coolant when starting the engine, and determines the engine is in either a cold operation or hot operation by comparing the soak time and the coolant temperature with a reference soak time and reference coolant temperature, which are predetermined by an electronic control system (ECU).

Specifically, the reference soak time is 6 hours, and the reference coolant temperature is 20° C. If the engine soak time is longer than 6 hours for which the engine may be sufficiently cooled and the measured initial temperature of the coolant is lower than 20° C., the engine is in cold operation. If not, it is determined that the engine is in hot operation.

As described above, when it is determined at the operation condition determination step that the engine is in cold operation, the cold control step is performed.

The cold control step sets cold operation reference voltage in the ECU, and performs cold control of the electronic waste gate actuator 10 depending on the reference voltage.

Simultaneously with the cold control, cold operation learning is performed. The cold operation learning applies cold operation learning data, in which voltage information according to the location of the electronic waste gate actuator 10 is collected, to the cold operation reference voltage.

On the other hand, when it is determined at the operation condition determination step that the engine is in hot operation, the hot control step is performed. The hot control step sets hot operation reference voltage in the ECU, and performs hot control of the electronic waste gate actuator.

In this case, hot operation learning is performed, and the hot operation learning collects the hot operation learning data using the same method of the cold control step and applies the data to the hot operation reference voltage.

The control method of an electronic waste gate actuator according to one form of the present disclosure further includes a cold limp-home conversion step and a hot limp-home conversion step.

As described above, at the cold control step or at the hot control step, the operation voltage of the electronic waste gate actuator 10 is measured in real time. In this case, the cold operation voltage collected at the cold control step is compared with the cold operation reference voltage, and the hot operation voltage collected at the hot control step is compared with the hot operation reference voltage, whereby whether abnormal operation occurs is determined.

If the cold operation voltage and the hot operation voltage are respectively greater than the cold operation reference voltage and the hot operation reference voltage, it is determined that an error has occurred in a turbocharger including the electronic waste gate actuator 10, and the vehicle is changed to a limp-home mode to minimize additional damage to the vehicle.

More specifically, the cold limp-home conversion step and the hot limp-home conversion step enable reduced driving by limiting the revolutions per minute (RPM) of the engine to be equal to or less than 2000 RPM.

Also, while the cold operation of the engine is performed after an initial start, when the temperature of the coolant increases and thus the operation is converted into the hot operation, the hot control step is carried out.

At the cold control step according to one form of the present disclosure, while the cold control is performed depending on the cold operation reference voltage, the coolant temperature is measured in real time and compared with the reference coolant temperature. Accordingly, when the coolant temperature is greater than the reference coolant temperature, which is 20° C., it is determined that the operation condition is changed from cold operation to hot operation due to the increase in temperature, and the cold control step is converted into the hot control step.

Consequently, depending on the voltage of an electronic waste gate actuator 10, which varies in response to the length of the rod 20, which changes according to whether the engine is in cold operation or in hot operation, the reference voltage is categorized into cold operation reference voltage and hot operation reference voltage. Also, the electronic waste gate actuator 10 is controlled by the cold operation reference voltage and hot operation reference voltage, whereby errors in signaling the warning light of a turbocharger and poor acceleration in a vehicle may be solved.

According to the one form of the present disclosure, it is possible to reduce errors in signaling a turbocharger warning light according to the operation mode of an engine.

Also, because a waste gate actuator is operated depending on the operation mode of the engine, poor acceleration in a vehicle is reduced and vehicle performance may be improved.

Although various forms of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method for controlling an electronic waste gate actuator (EWGA) in an electronic waste gate actuator system in which the electronic waste gate actuator is connected to a waste gate valve via a rod, the method comprising:
    an operation condition determination step for determining whether an engine is in cold operation or in hot operation by measuring an engine soak time and an initial temperature of coolant when the engine starts and by respectively comparing the engine soak time and the initial temperature of the coolant with a predetermined reference soak time and a predetermined reference coolant temperature;
    a cold control step for setting a cold operation reference voltage, for performing cold operation learning, and for applying cold operation learning data to the cold operation reference voltage, when it is determined at the operation condition determination step that the engine is in cold operation, wherein at the cold control step, a cold operation voltage of the EWGA is measured in real time during driving of the vehicle;
    a cold limp-home conversion step for converting into a limp-home mode in which rpm of the engine is limited to be equal to or less than a set reference rpm when the cold operation voltage is greater than the cold operation reference voltage after the cold control step;
    a hot control step for setting a hot operation reference voltage, for performing hot operation learning, and for applying hot operation learning data to the hot operation reference voltage, when it is determined at the operation condition determination step that the engine is in hot operation, wherein at the hot control step, a hot operation voltage of the EWGA is measured in real time during driving of the vehicle; and
    a hot limp-home conversion step for converting into a limp-home mode in which rpm of the engine is limited to be equal to or less than a set reference rpm when the hot operation voltage is greater than the hot operation reference voltage after the hot control step.

2. The method of claim 1, wherein the cold control step is configured to measure in real time a driving coolant temperature during driving of a vehicle while controlling the EWGA depending on the cold operation reference voltage, and to change to the hot control step when the driving coolant temperature is greater than the reference coolant temperature.

3. The method of claim 1, wherein the cold limp-home conversion step comprises an alarm step in which an alarm is output to enable a driver to recognize a risk state of the engine.

4. The method of claim 1, wherein the hot limp-home conversion step comprises an alarm step in which an alarm is output to enable a driver to recognize a risk state of the engine.

5. The method of claim 1, wherein the reference soak time is 6 hours and the reference coolant temperature is 20° C.

6. The method of claim 1, wherein at the cold control step, the set reference rpm of the engine is limited to be 2000 rpm.

7. The method of claim 1, wherein at the hot control step, the set reference rpm of the engine is limited to be 2000 rpm.

* * * * *